(12) United States Patent
Silvi et al.

(10) Patent No.: US 6,391,234 B1
(45) Date of Patent: May 21, 2002

(54) COMPOUNDING FILLED SILICONE COMPOSITIONS

(75) Inventors: Norberto Silvi, Clifton Park; Robert Edward Dean, Rexford; Mark Howard Giammattei, Selkirk; John William Carbone, Niskayuna; Navjot Singh, Clifton Park; Gerardo Rocha Galicia, Waterford; John Peter Banevicius, Clifton Park, all of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/468,622

(22) Filed: Dec. 21, 1999

(51) Int. Cl.⁷ .................................................. B29B 7/82
(52) U.S. Cl. ..................... 264/101; 264/102; 264/210.6; 264/211.23; 524/588; 425/205
(58) Field of Search ................................. 264/101, 102, 264/211.23, 210.6; 524/588; 425/205

(56) References Cited

U.S. PATENT DOCUMENTS

| | | |
|---|---|---|
| 3,824,208 A | 7/1974 | Link et al. |
| 4,528,324 A | 7/1985 | Chung et al. |
| 4,737,561 A | 4/1988 | Stary et al. |
| 4,898,898 A | 2/1990 | Fitzgerald et al. |
| 5,153,238 A | 10/1992 | Bilgrien et al. |
| 5,198,171 A | 3/1993 | Kasahara et al. |
| 5,338,112 A | 8/1994 | Boden et al. |
| 5,409,978 A | 4/1995 | Hamada et al. |
| 5,531,923 A | 7/1996 | LeBlanc et al. |
| 5,573,189 A | 11/1996 | Ward et al. |
| 5,623,028 A | 4/1997 | Fitzgerald et al. |
| 5,679,726 A | 10/1997 | Gutek et al. |
| 5,910,276 A | 6/1999 | Guntherberg et al. |
| 5,925,709 A | 7/1999 | Takahashi et al. |

FOREIGN PATENT DOCUMENTS

| | | |
|---|---|---|
| EP | 570387 B1 | 12/1994 |
| EP | 902057 A2 | 3/1999 |

OTHER PUBLICATIONS

"Encyclopedia of Polymer Science and Engineering, vol. 6", edited by Mark et al., John Wiley & Sons Inc., 1986, p. 585.

*Primary Examiner*—Robert Dawson
*Assistant Examiner*—Marc S. Zimmer
(74) *Attorney, Agent, or Firm*—Andrew J. Caruso; Noreen C. Johnson

(57) ABSTRACT

High levels of inorganic filler, processing fluid and silicone polymer are compounded and devolatilized into homogeneous filled compositions with requisite reinforcing properties and levels of volatiles. In the method, a filler, processing fluid and silicone polymer are mixed in a first compounding apparatus to produce a dispersed composition containing volatiles. The dispersed composition is then compounded in a long extruder having an L/D ratio of greater than 50 to devolatilize the dispersed composition.

23 Claims, 3 Drawing Sheets

COMPOUNDING FILLED SILICONE COMPOSITIONS

BACKGROUND OF THE INVENTION

The invention relates to a method of compounding heat-vulcanizable silicone compositions.

A heat-vulcanizable silicone composition comprises a high viscosity silicone polymer, an inorganic reinforcing filler and various additives that aid processing or impart desired final properties to the composition. A vulcanizing agent can be added and the composition heat-cured to fabricate silicone rubber moldings such as gaskets, medical tubing and computer keypads.

Typically, the heat-vulcanizable silicone composition is produced by kneading a high-viscosity polydiorganosiloxane, the inorganic filler and additives by means of a batch kneading machine such as a high intensity Banbury mixer or a low intensity double arm dough mixer. In this process, polydiorganosiloxane, inorganic filler and treating agents are batch mixed until desired properties are obtained. This process requires long residence times and large amounts of energy. Non-homogeneous shear and extensional stresses across a commercial sized batch can result in non-uniform size distribution of filler that results in variations in properties. Batches processed at different times may be characterized by different physical properties. The batch process is labor, energy and capital intensive and produces materials of only marginal consistency.

In Kasahara et al., U.S. Pat. No. 5,198,171, a preconcentrate of polydiorganosiloxane, inorganic filler and treating agents is formed by a high speed mechanical shearing mixer. The resulting premix is further compounded in a same-direction double screw extruder. The premix is formed in a first step wherein a diorganopolysiloxane having a viscosity at 25° C. of $1 \times 10^5$ cP or more, an inorganic filler and a treating agent are mixed in a high-speed mechanical shearing machine to provide a flowable particulate mixture in which each ingredient is present in a substantially uniform, finely dispersed state. The flowable particulate mixture is then fed at a constant feed rate into a kneading and extruding machine that has two screws rotating in the same direction and has a length to diameter ratio (L/D) of 25 to 50.

In Hamada et al., U.S. Pat. No. 5,409,978, a preconcentrate of polydiorganosiloxane, inorganic filler and treating agents is formed at a temperature in the range of about 200° C. to 300° C. in a co-rotating continuous double screw extruder with L/D of about 25 to 50. The preconcentrate is then compounded and heat treated at 150° C. to 300° C. in a counter-rotating, double screw extruder. A useful L/D ratio for the extruder is in the range of about 5 to 15.

Highly vigorous first step processes for forming a composition of silicone polymer, filler and treating agent generate a product having a high volatiles content. The composition must be devolatilized in a second step to produce a useful product. Devolitilization is important for at least two reasons. First, devolitilization removes unreacted treating agents to "quench" further reaction with filler silanol groups. Otherwise, further reaction can diminish filler reinforcement properties in the heat-vulcanizable silicone composition. Second, devolitilization removes surplus liquids that adversely affect rheological properties of the silicone composition. Residual volatiles in the filled silicone composition should not exceed the level of about 2% by weight of the final formulation. Preferably, residual volatiles in the filled silicone composition should not exceed the level of about 1%.

However, devolitilization is not complete in known two-step processes. There is a need for a process that continuously and consistently produces a devolatilized high viscosity filled silicone polymer composition from filler, additive and polymer. Further, there is a need for an improved continuous compounding process.

BRIEF SUMMARY OF THE INVENTION

The invention provides a process that compounds high levels of inorganic filler, processing fluid and silicone polymer into homogeneous filled and devolatilized silicone compositions with requisite reinforcing properties and levels of volatiles. The method comprises mixing a filler, processing fluid and silicone polymer into a first compounding apparatus to produce a dispersed composition containing volatiles. The dispersed composition is then compounded in an extruder having an L/D ratio of greater than 50 to devolatilize the dispersed composition.

In another aspect, a process of compounding a filled silicone composition comprises forming a premix of filler and silicone polymer in a first mixer. The premix is then compounded with further filler and silicone polymer and added processing fluid in a first compounding apparatus to produce a dispersed composition containing volatiles. The dispersed composition is devolatilized in an extruder having an L/D ratio of greater than 50.

In still another aspect, a system is provided for compounding filled silicone compositions. The system comprises a first compounding apparatus and an extruder having an L/D ratio of greater than 50. The extruder is connected to the first compounding apparatus to continuously receive a dispersed composition containing volatiles.

DETAILED DESCRIPTION OF THE INVENTION

Figure 1:
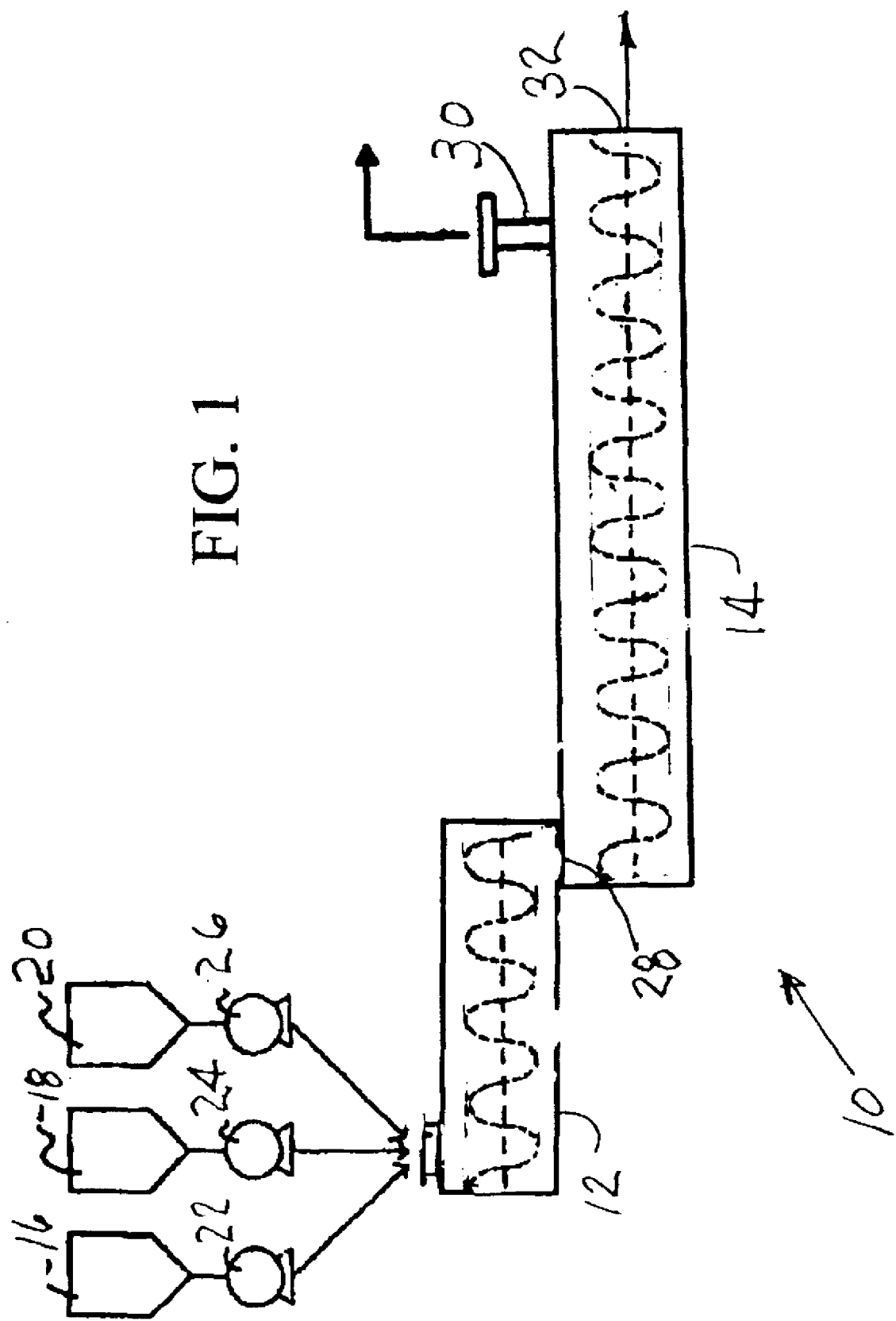
FIG. 1 is a schematic representation of a silicone composition compounding process and system.

A process and system are provided by the invention to compound high levels of components such as treated fumed silica and processing fluid into a silicone polymer, such as high molecular weight poly(dimethylsiloxane). The process and system produce a homogeneous mixture having required reinforcing properties and levels of residual volatiles. The process includes at least two continuous compounding steps, wherein filler and silicone polymer are mixed and compounded in a first extruder and devolatilized in a long second extruder. A long extruder is defined as an extruder having a length to diameter ratio of at least about 50. In one embodiment, the long extruder can have a length to diameter ratio of at least about 60.

The processing fluid of the invention is a fluid that can be admixed with a filler and compounded to densify a filler for further processing. The processing fluid can also provide a processing function. It can be a liquid treating agent, plasticizer, flow improving additive, cross-linking agent, water or inert blanketing gas. Silicone polymers of a molecular weight greater than 7000 are not processing fluids. Preferably, the processing fluid is a liquid treating agent such as a silanol-reacting treating agent that can be added before, with or after addition of filler to wet the filler to reduce overall processing time for reaction between functional groups in the treating agent and silanols on the surface of the filler.

In one embodiment, the processing fluid is a solution prepared by mixing (in weight) 1.21 parts of a silanol-stopped polydimethylsiloxane, 1.82 parts of a vinyl-stopped dimethyl-methylvinylsiloxane and 0.12 part of a hydroxy-terminated polydimethyl-methylvinylsiloxane. A broad range of parts of silanol-stopped polydimethylsiloxane/ vinyl-stopped dimethyl-methylvinylsiloxane/hydroxy-terminated polydimethyl-methylsiloxane can be 0.49/0.73/ 0.05 to 1.93/2.91/0.19, a desired range is 0.85/1.27/0.08 to 1.57/2.37/0.16 and a preferred range is 1.09/1.64/0.11 to 1.32/2.0/0.13.

In another embodiment, the processing fluid can be a combination of treating agent, preferably HMDZ and water. This combination can comprise a weight ratio of treating agent/water of between about 0.05 to about 50 or between about 0.1 and about 20 or between about 1 and about 6. The HMDZ can be added either together with a premix or separately at a single or at multiple locations of an extruder or to a batch mixer in the compounding step.

The processing fluid can be combined with filler in a weight proportion of about 0.1 to about 100 parts fluid to 100 parts of filler, desirably about 0.5 to about 75 parts fluid to 100 parts of filler and preferably about 1.0 to about 50 parts fluid to 100 parts of filler. The processing fluid can be added at a single location or at a plurality of locations for step treatment of the filler.

The inorganic filler that can be used in the invention can be any inorganic filler used in blends with silicone polymers. Examples of inorganic fillers include a reinforcing silica such as fumed silica or precipitated silica or a silica that has been surface-treated with an organosilicon compound such as an organopolysiloxane, organoalkoxysilane, organochlorosilane or a hexaorganodisilazane. The filler can be diatomaceous earth, finely crushed quartz, aluminum oxide, titanium oxide, iron oxide, cerium oxide, cerium hydroxide, magnesium oxide, zinc oxide, calcium carbonate, zirconium silicate, carbon black or ultramarine. A single filler or a combination of fillers can be used to reinforce the silicone polymer.

The amount of the filler can be in the range of from about 5 to about 200 parts by weight, desirably from about 10 to about 100 parts by weight and preferably from about 20 to about 60 parts by weight, per 100 parts by weight of silicone polymer.

The concentration of residual silanol groups on the surface of a filler can govern strength of hydrogen bonds between the silica and hydroxyl or oxygen groups in the silicone polymer chain. High concentrations of residual silanols in a filler cause "structuring" or "crepe hardening" of the final product in storage. This effect leads to difficulties in the processing of the material after it has been stored for extended periods. If the concentration of silanol functional groups in a filler is too high, a treating agent can be added to reduce the groups to a required concentration. The silanol reactant treating agent can react to reduce available groups to a concentration of between about 8 to about 2 hydroxyl groups/(nanometer)$^2$ of filler, preferably between about 5 to about 3 hydroxyl groups/(nanometer)$^2$ of filler. The surface-treated silica is a preferred filler in the invention, in an amount from about 10 to about 100 parts by weight, preferably from about 20 to about 60 parts by weight, per 100 parts by weight of silicone polymer.

In one embodiment, a treating agent is mixed into the filler along with the processing fluid or as the processing fluid to reduce filler silanol groups, to improve dispensability of the filler and/or to reduce the time required for aging of the silicon rubber, to prevent crepe hardening and/or to regulate plasticity. The treating agent can be the silanol-reacting reagent or another filler treating agent. The treating agent is preferably a silanol reactant treating agent when the filler is a silica or other silanol containing filler. The treating agent can be an organosilane, a low-viscosity polysiloxane or a silicone resin, which has a silanol group and/or an alkoxy group having 1 to 6 carbon atoms. Examples include diphenyl-silanediol, dimethylsilanediol, methyltriethoxysilane and phenyltrimethoxysilane. The low-viscosity polysiloxane may contain one or more kinds of organic groups selected from a methyl group, a phenyl group, a vinyl group and a 3,3,3-trifluoropropyl group. The viscosity of the polysiloxane measured at 25° C. is in the range of from about 1 to about 300 cP, preferably from about 5 to about 100 cP. Preferred silanol-reactant treating agents include silanol-stopped polydimethylsiloxane, octamethylcyclotetrasiloxane (D4) and hexamethyldisilazane (HMDZ).

The silicone polymer used in the compositions of the present invention is represented by recurring units of Formula I:

Formula I

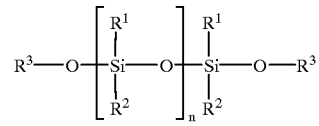

wherein, $R^1$ independently at each occurrence represents $C_{1-4}$ alkyl, or $C_{2-4}$ alkylene; $R^2$ independently at each occurrence represents $C_{1-4}$ alkyl, $C_1$–$C_4$ haloalkyl or $C_{2-4}$ alkylene; $R^3$ independently at each occurrence represents H, $C_{1-10}$ alkyl, $C_{2-4}$ alkylene, $C_{4-6}$ cycloalkyl, OH or $C_1$–$C_4$ haloalkyl; and n represents an integer from 1,000 to 20,000.

A further preferred composition comprises a silicone polymer wherein, $R^1$ independently at each occurrence represents, $CH_3$ or $CH=CH_2$; $R^2$ independently at each occurrence represents, $CH_3$, $CH=CH_2$ or $CH_2CH_2CF_3$; $R^3$ independently at each occurrence represents $CH_3$, $CH=CH_2$, OH or $CH_2CH_2CF_3$; and n represents an integer from about 4,000 to about 10,000.

Another embodiment provides a composition wherein the vinyl content of the silicone polymer ranges from about 0.05% to about 0.5% by weight of the silicone polymer.

The silicone composition can also include other additives such as heat-resistance improvers such as oxides, hydroxides and fatty acid salts of metals, vulcanization reverse inhibitors, flame retardants such as platinum compounds, discoloration preventive agents, plasticizers such as silicone oil, internal release agent such as metal soaps, pigments and dyes.

During processing, an inert blanketing gas can be added to the compounding environment to suppress oxidative reactions between a flammable processing fluid such as HMDZ, and air. The amount of inert gas can be in the range of from about 20 to about 800 parts by weight, desirably from about 50 to about 600 parts by weight and preferably from about 100 to about 400 parts by weight per 100 parts by weight of the filler.

In an embodiment of the invention, fumed silica filler is mixed with a processing fluid that comprises HMDZ and water at a first location prior to addition of the silicone polymer. The amount of HMDZ can be in the range of from about 0.1 to about 100 parts by weight, desirably from about 0.5 to about 50 parts by weight and preferably from about 1.0 to about 20 parts by weight, per 100 parts by weight of the fumed silica. The amount of water can be in the range of from about 0.1 to about 100 parts by weight, desirably from about 0.5 to about 20 parts by weight and preferably from about 1 to about 10 parts by weight, per 100 parts by weight of the fumed silica.

The first extruder used in the invention can be a double screw extruder of the co-rotating intermeshing type. Or, the extruder can be a counter-rotating, non-intermeshing double screw extruder or a single screw extruder, either of the reciprocating or of the non-reciprocating type. The co-rotating, intermeshing double screw extruder is especially suited for the process of this invention due to its capability to produce the conditions needed for the preparation of the filler for compounding with the silicone polymer. Namely the extruder can provide a severe compounding and mixing energy. The extruder can have multiple addition ports for on-stream addition of the components of the compounded silicones.

The long extruder can be a counter-rotating, non-intermeshing double screw extruder, a co-rotating, intermeshing double screw extruder or a single screw reciprocating or non-reciprocating extruder. The long extruder provides the high rates of interfacial area generation that are needed to facilitate diffusion of volatile components through polymer-vapor interfaces. The volatile components are then diffused into a vapor space of the extruder and eliminated through vents. In one embodiment of the invention, the long extruder is a single screw reciprocating or non-reciprocating extruder of an L/D greater than 40.

Addition to the extruder of the individual components of the formulation, filler densification, chemical reaction between filler and treating agent, dispersion of filler into the silicone polymer to produce a homogeneous mixture and devolatilization of the homogenized material are unit operations that are performed sequentially or concurrently. According to the invention, conditions in the extruder can be controlled to carry out these operations with complete product devolatilization. Hence in another embodiment, the invention relates to extrusion conditions, including compounding and devolatilization used to compound large amounts of filler particularly fumed silica and processing fluid, treating agent and silicone polymer.

Throughput and screw speed can be adjusted in the extruders to allow for efficient compounding and devolatilization. Low throughput under utilizes the capacity of manufacturing equipment. On the other hand, throughput is limited by the rate at which fumed silica can be added into an extruder. High screw speeds are needed for addition and dispersion of filler and dispersion of additives into the silicone matrix and for generation of surface area for devolatilization. However, temperature rises with viscous dissipation and screw speed. The use of severe screw speeds can result in thermal degradation of the silicone polymer. In the invention, scalable throughput with balanced mixing intensity provides effective compounding and reaction of silicone composition components with adequate process devolatilization due to material viscosity and extruder screw speed.

An extruder screw speed for either the first extruder or the long extruder can be between about 30 rpm and about 1000 rpm to provide a suitable balancing of mixing with frictional heat generation. Desirably, the screw speed is between about 100 rpm and about 800 rpm and preferably between about 300 rpm and about 500 rpm. A ratio of throughput to screw speed (lb/hour/rpm) for the first extruder or the long extruder can be between about 0.01 to about 500, desirably between 0.05 and about 200 and preferably between 1.0 and 100 (lb/hour/rpm).

Exterior first extruder barrel temperature can be between about 20° C. and about 200° C., desirably between about 30° C. and about 150° C., and preferably between about 40° C. and about 100° C. Automatic tuning and programmable temperature controllers with time proportioning output in heating and cooling can be used for zone temperature control and thermocouples with plug ends can be used for barrel temperature measurements. For devolatilization, the long extruder barrel temperature can be between about 150° C. and about 200° C., desirably between about 160° C. and about 190° C. and preferably between about 170° C. and about 180° C.

The compositions produced by the process of the invention meet physical property standards for heat-vulcanizable silicone compositions. For example, the compositions can be characterized by a Williams Plasticity of greater than 100, Shore A hardness of greater than 20, tensile strength of greater than 750 psi, elongation at break of at least 100%, Tear B of at least 10 ppi, Specific Gravity of at least 1.05 and residual volatiles below 1 weight percent.

These and other features will become apparent from the following drawings and detailed discussion, which by way of example without limitation describe embodiments of the present invention.

Figure 2:
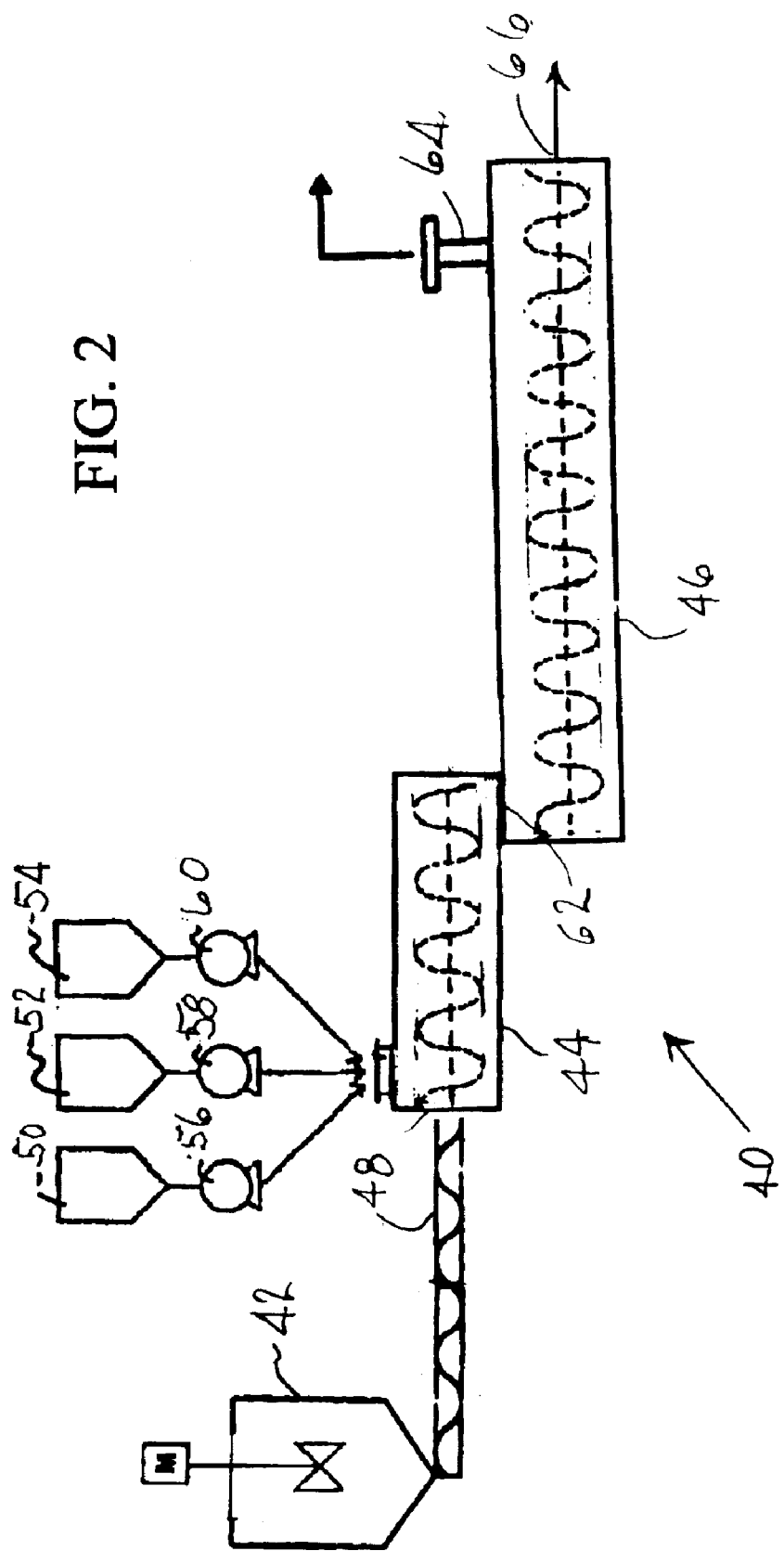
FIG. 2 is a schematic representation of another silicone composition compounding process and system.
Figure 3:
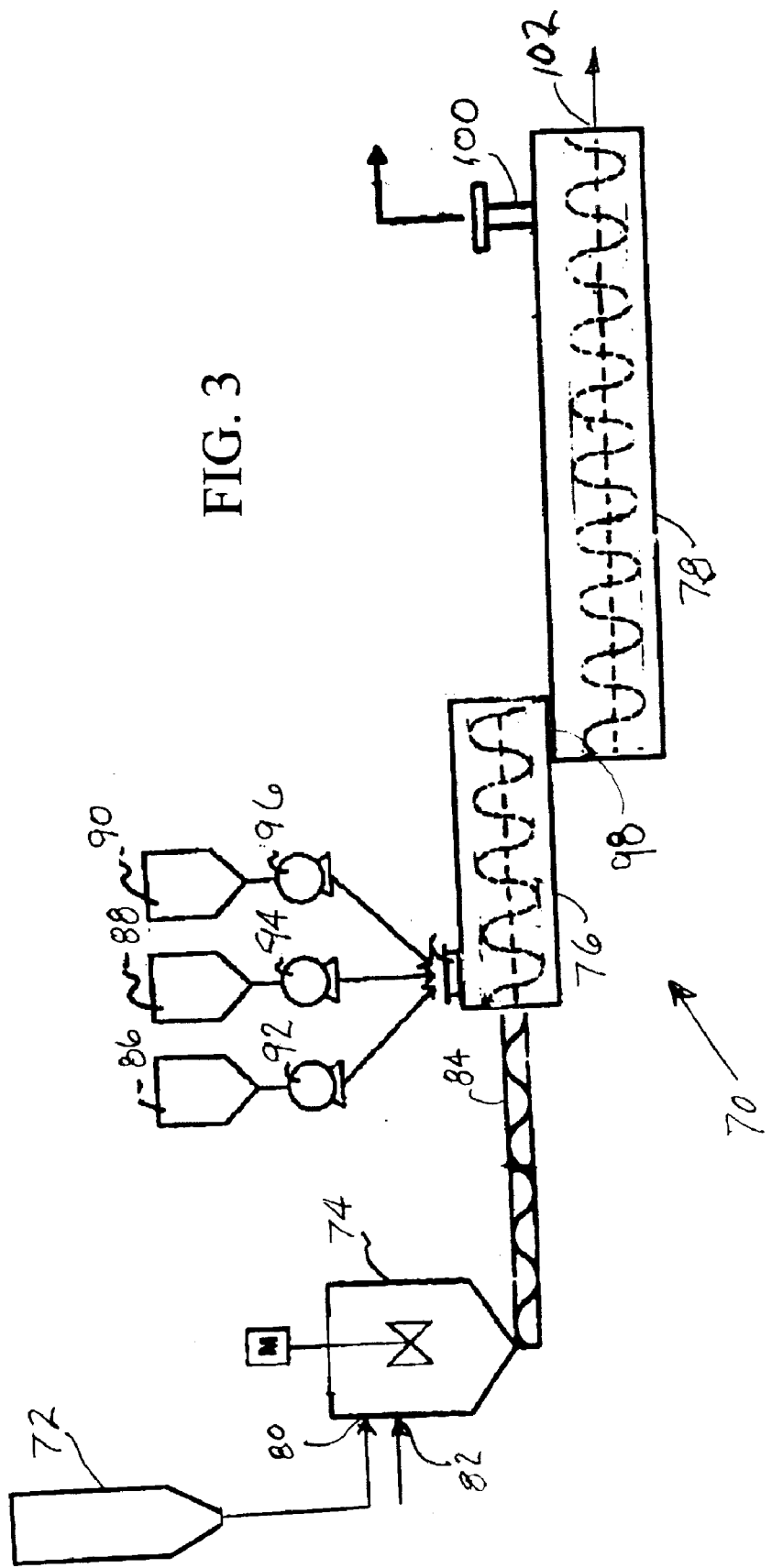
FIG. 3 is a schematic representation of still another silicone composition compounding process and system.

In the drawings, FIGS. 1–3 are schematic representations of silicone compounding processes and systems for carrying out embodiments of the invention. In FIG. 1, an overall process and system for compounding filled silicone compositions is designated 10. The system includes first extruder 12 and long extruder 14.

The first extruder 12 can be a double screw extruder of the co-rotating or counter-rotating, intermeshing type, a counter-rotating, non-intermeshing type, a single-screw reciprocating or a single screw non-reciprocating type. Multiple extruder stages can be used as the first extruder to compound filler, treating agent and silicone polymer. The homogenous material can be fed to the long extruder. The compounded material can be force-fed from the first extruder to the long extruder by the use of pressure generated internally by the rotation of the extruder screws.

The long extruder 14 can be a counter-rotating, non-intermeshing double screw extruder, a co-rotating, intermeshing double screw extruder or a single screw reciprocating or non-reciprocating extruder of an L/D of greater than 50. The long extruder 14 is designed to operate at high temperatures and to provide the open surface areas necessary for devolatilization. The long extruder 14 provides the high pressurization necessary to pump compounded product out of the final extruder 14.

In the process of FIG. 1, filler, processing fluid, which in this embodiment includes a treating agent and silicone polymer are continuously supplied from respective storage tanks 16, 18 and 20 by means of respective feed pumps 22, 24 and 26 into first extruder 12. In extruder 12, the filler, processing fluid and silicone polymer are continuously compounded and discharged as an extrudate, which is force fed 28 into long extruder 14 having a L/D ratio of greater than 50. Long extruder 14 is provided with vent 30 for extrudate devolatilization. Vent 30 can represent a plurality of vents in applications that require more than one vent for effective devolatilization. After venting, a compounded and devolatilized filled silicone composition is discharged through long extruder end 32.

In FIG. 2, the system 40 includes mixer 42, first extruder 44 and long extruder 46. In the process of FIG. 2, filler and silicone polymer are combined and mixed in mixer 42 to form a premix which is fed 48 into first extruder 44. Additional filler, processing fluid and additional silicone polymer are continuously supplied from respective storage tanks 50, 52 and 54 by means of respective feed pumps 56, 58 and 60 into first extruder 44 where they are continuously compounded and discharged as an extrudate, which is continuously force fed 62 into long extruder 46 having a L/D ratio of greater than 50. Long extruder 46 is provided with vent 64 for extrudate devolatilization. After venting, a compounded and devolatilized filled silicone composition is discharged through long extruder end 66.

In FIG. 3, the system 70 includes reactor 72, mixer 74, first extruder 76 and long extruder 78. A raw filler and a treating agent are reacted in reactor 72 to form a pretreated filler, which is discharged 80 to mixer 74. Silicone polymer is added 82 to the pretreated filler and mixed in mixer 74 to form a premix. The premix is fed 84 into first extruder 76. Additional filler, processing fluid and silicone polymer are continuously supplied from respective storage tanks 86, 88 and 90 by means of respective feed pumps 92, 94 and 96 into first extruder 76 where they are continuously compounded and force fed 98 as an extrudate into long extruder 78 having a L/D ratio of greater than 50. Long extruder 78 is provided with vent 100 for extrudate devolatilization. After enting, a compounded and devolatilized filled silicone composition is discharged through long extruder end 102.

EXAMPLES

In these Examples, compounding was performed in a 2-inch diameter, co-rotating, intermeshing double screw first extruder. The extruder had a length to diameter ratio of about 8. The barrel of this extruder could be heated or cooled but had no venting capability. The first extruder screws were operated at between 50 and 400 rpm. The first extruder was capable of compounding filler and silicone polymer compositions into an homogeneous filled silicone composition.

Devolatilization was performed in a 30 mm diameter, counter-rotating, non-intermeshing double screw long extruder. The long extruder had a length-to-diameter ratio of 60. The long extruder was equipped with three vacuum vents (designated upstream, downstream and intermediate) vents for devolatilization. The vents were capable of being operated at absolute pressures as low as a few millimeters of mercury. The long extruder had segmented barrels that could be maintained at a constant temperature using recirculating heated oil. The long extruder included two 1.05 inch outside diameter (OD) cylindrical elements before the upstream vent, two 0.95 inch OD cylindrical screw elements between the upstream and the intermediate vent, two 0.9 inch OD cylindrical screw elements between the intermediate and downstream vent and a last 0.915 inch single, forward flighted screw element that could be used for pumping. The screws were capable of rotation at speeds between 300 and 500 rpm.

In the processes described in the Examples, all of the components of the compositions were added to the co-rotating, intermeshing first extruder at an upstream portion of the process. A particulate concentrate of D4 treated fumed silica and high molecular weight silica polymer was prepared in a Henschel batch mixer and was added at the first extruder feed throat using an Acrison feeder. A mixture of liquid additives was incorporated at the first upstream injection port and silicone polymer was added at a side feeding port by means of a positive displacement gear pump.

Table 1 includes operating conditions and feed rates at the first co-rotating, intermeshing extruder for each of runs 1001 through 1004.

|  | 1001 | 1002 | 1003 | 1004 |
|---|---|---|---|---|
| screw speed (rpm) | 100 | 100 | 250 | 250 |
| filler/polymer premix (lb/hr) | 39.985 | 31.984 | 32.051 | 39.936 |
| silicone polymer (lb/hr) | 18.17 | 26.09 | 26.09 | 18.17 |
| vinyl silazane additive (lb/hr) | 0.024 | 0.024 | 0.066 | 0.066 |
| vinyl-stopped silicone additive (lb/hr) | 0.547 | 1.251 | 0.547 | 1.251 |
| silanol stopped silicone additive (lb/hr) | 0.541 | 1.260 | 0.541 | 1.260 |

Table 2 includes conditions for devolatilization in the long extruder.

|  | 1001 | 1002 | 1003 | 1004 |
|---|---|---|---|---|
| screw speed (rpm) | 400 | 375 | 375 | 450 |
| pump vacuum (In Hg) | 29 | 29 | 29 | 29 |
| vent pressure (mm Hg) | 2 | 2 | 3.5 | 3.7 |
| Number of Vents | 2 | 2 | 2 | 2 |

Table 3 shows product properties for the Examples of Tables 1 and 2.

|  | 1001 | 1002 | 1003 | 1004 |
|---|---|---|---|---|
| Shore A Hardness | 51.3 | 41.8 | 38.0 | 51.1 |
| Tensile Strength (ppi) | 1206 | 876 | 1077 | 1063 |
| Elongation (%) | 404 | 456 | 516 | 420 |
| Tear B (ppi) | 93 | 68 | 72 | 147 |
| Residual Volatiles (weight percent) | 0.61 | 0.72 | 0.65 | 0.77 |
| Specific Gravity | 1.132 | 1.094 | 1.097 | 1.129 |

The Examples illustrate the invention conducted with ranges of formulations and process conditions. The results of Table 3 show that the process of the invention can produce materials within physical property standards for filled heat-vulcanizable silicone compositions.

What is claimed is:

1. A method of compounding a filled silicone composition, comprising:
   compounding a filler, processing fluid and silicone polymer in a first compounding apparatus selected from the group consisting of a co-rotating, intermeshing double screw extruder; a counter-rotating, non-intermeshing double screw extruder; a single screw reciprocating extruder, and a single screw non-reciprocating extruder to produce a dispersed composition containing volatiles; and devolatilizing said dispersed composition in a long extruder having an L/D ratio of greater than 50 to devolatilize said dispersed composition.

2. The process of claim 1, wherein said devolatilizing step is conducted in a long extruder having an L/D ratio of greater than about 60 to devolatilize said dispersed composition.

3. The process of claim 1, wherein said filler is a raw, untreated silica.

4. The process of claim 1, wherein said filler is a pre-treated filler with treating agent.

5. The process of claim 4, wherein said treating agent is a silanol-reacting treating agent.

6. The process of claim 1, wherein said compounding apparatus comprises a first co-rotating, intermeshing double screw extruder; and said long extruder comprises a counter-rotating, non-intermeshing double screw extruder.

7. The process of claim 1, wherein said compounding apparatus comprises a first counter-rotating, non-intermeshing double screw extruder; and said long extruder comprises a co-rotating, intermeshing double screw extruder.

8. The process of claim 1, wherein said compounding apparatus comprises a single screw reciprocating extruder or a single screw non-reciprocating extruder; and said long extruder comprises a co-rotating, intermeshing double screw extruder; or a counter-rotating, non-intermeshing double screw extruder.

9. The process of claim 1, wherein said compounding apparatus comprises a co-rotating, intermeshing double screw extruder; and said long extruder comprises a single screw reciprocating extruder or single screw non-reciprocating extruder.

10. The process of claim 1, wherein said filler contains silanol groups and said processing fluid is a treating agent comprising silanol-stopped polydimethylsiloxane, octamethylcyclotetrasiloxane (D4) or hexamethyldisilazane (HMDZ).

11. The process of claim 1, wherein said processing fluid is selected from the group consisting of silanol-stopped polydimethylsiloxane, vinyl-stopped dimethylmethylvinylsiloxane and hydroxy-terminated polydimethylmethylvinylsiloxane.

12. The process of claim 1, wherein said compounding is completed in said compounding apparatus that is about 30 diameters or less in length.

13. The process of claim 1, comprising controlling said compounding to provide a total throughput to screw speed ratio in said compounding apparatus between about 0.01 and about 500 (lb/hour/rpm) and controlling said devolatilization to provide a total throughput to screw speed ratio in said extruder between about 0.01 and about 500 (lb/hour/rpm).

14. The process of claim 1, comprising controlling said compounding to provide a total throughput to screw speed ratio in said compounding apparatus between about 0.05 and about 200 (lb/hour/rpm) and controlling said devolatilization to provide a total throughput to screw speed ratio in said extruder between about 0.05 and about 200 (lb/hour/rpm).

15. The process of claim 1, comprising controlling said compounding to provide a total throughput to screw speed ratio in said compounding apparatus between about 1.0 and about 100 (lb/hour/rpm) and controlling said devolatilization to provide a total throughput to screw speed ratio in said extruder between about 1.0 and about 100 (lb/hour/rpm).

16. A process of compounding a filled silicone composition, comprising:

forming a premix of filler and silicone polymer in a first mixer; compounding said premix with further filler and silicone polymer and added processing fluid in a first compounding apparatus selected from the group consisting of a co-rotating, intermeshing double screw extruder; a counter-rotating, non-intermeshing double screw extruder; a single screw reciprocating extruder, and a single screw non-reciprocating extruder to produce a dispersed composition containing volatiles; and devolatilizing said dispersed composition in a long extruder having an L/D ratio of greater than 50 to devolatilize said dispersed composition.

17. A method of compounding a filled silicone composition, comprising:

compounding a filler, processing fluid and silicone polymer in a first single screw reciprocating extruder to produce a dispersed composition containing volatiles; and devolatilizing said dispersed composition in a long extruder having an L/D ratio of greater than 50 to devolatilize said dispersed composition.

18. The process of claim 17, wherein said devolatilizing step is conducted in a long extruder having an L/D ratio of greater than about 60 to devolatilize said dispersed composition.

19. The process of claim 17, wherein said filler is a raw, untreated silica.

20. The process of claim 17, wherein said filler is a pretreated filler with treating agent.

21. The process of claim 20, wherein said treating agent is a silanol-reacting treating agent.

22. The process of claim 17, wherein said long extruder comprises a counter-rotating, non-intermeshing double screw extruder.

23. The process according to claim 16 wherein said long extruder is selected from the group consisting of a co-rotating, intermeshing double screw extruder; a counter-rotating, non-intermeshing double screw extruder; a single screw reciprocating extruder, and a single screw non-reciprocating extruder.

* * * * *

UNITED STATES PATENT AND TRADEMARK OFFICE
CERTIFICATE OF CORRECTION

PATENT NO. : 6,391,234 B1
DATED : May 21, 2002
INVENTOR(S) : Silvi et al.

It is certified that error appears in the above-identified patent and that said Letters Patent is hereby corrected as shown below:

Column 8,
Line 64, cancel "method" and substitute -- process --.

Column 10,
Line 29, cancel "method" and substitute -- process --.

Signed and Sealed this

Twenty-seventh Day of December, 2005

JON W. DUDAS
*Director of the United States Patent and Trademark Office*